United States Patent [19]

Mace

[11] Patent Number: 4,843,753

[45] Date of Patent: Jul. 4, 1989

[54] APPARATUS FOR BAITING A FISHING HOOK

[76] Inventor: Gilbert G. Mace, 4678 Alcott, Denver, Colo. 80211

[21] Appl. No.: 192,299

[22] Filed: May 10, 1988

[51] Int. Cl.⁴ ............................................. A01K 97/00
[52] U.S. Cl. .......................................................... 43/4
[58] Field of Search ...................................... 43/4, 4.5

[56] References Cited

U.S. PATENT DOCUMENTS

| | | | |
|---|---|---|---|
| 2,611,982 | 9/1952 | Sears | 43/4 |
| 2,670,557 | 3/1954 | Pachner | 43/4 |
| 2,885,814 | 5/1959 | Schlador | 43/4 |
| 3,201,888 | 8/1965 | Barbee | 43/4 |
| 3,862,507 | 1/1975 | Martyn | 43/4 |
| 3,921,327 | 11/1975 | Casazza | 43/4 |

Primary Examiner—Gene P. Crosby
Attorney, Agent, or Firm—Douglass F. Vincent

[57] ABSTRACT

A two pronged apparatus for baiting a fishing hook without contact between the bait and the fisherman's hands. Two resiliently opposed base portions are joined at a common end and have arms extending therefrom. Each arm culuminates in a gripping portion defining a slot which is open at one end. The apparatus is operated by gripping with the hand with the index finger extending along one arm and the thumb extending along the opposite arm. By alternately squeezing the thumb and forefinger together, bait may be picked up between the gripping portions. While the bait is held by the gripping portions, a fishing hook is inserted through one slot, piercing the bait and exiting through the opposite slot. In this fashion, a fishing hook may be baited without the bait being touched by human hands. In one example a roughened inner surface is provided on each gripping portion to provide improved traction for gripping the bait.

2 Claims, 1 Drawing Sheet

APPARATUS FOR BAITING A FISHING HOOK

TECHNICAL FIELD

This invention relates to apparatus for baiting a fishing hook and more particularly to a two pronged apparatus for holding bait while a hook is inserted therethrough.

BACKGROUND ART

Fishing is often accomplished by using a fishing pole, line, fishing hook, and bait attached to the fishing hook. When fishing is done in this manner, smells associated with the baiting of the hook may cause problems. One problem is that when the bait, such as salmon eggs or worms, are handled by human hands in baiting the hook, human smells may be transferred to the bait in this way. Fish are known to be quite sensitive to scents in the water and are likely to be scared away by the smell of human hands transferred to the bait. Conversely, smells may be transferred from the bait to the human being during the baiting of the hook by conventional manual methods. In addition, germs, bacteria, slime, and other matter may be transferred from the bait to the human being resulting in a cleanliness problem.

Various solutions to these problems of smell and cleanliness have been attempted in the past. Gloves have been used to prevent the transfer of scents and of matter between the human hands and the bait. However, gloves add another layer to an already delicate operation and add to the awkwardness of the operation. In addition, gloves themselves will pick up smells both from the human being and from the bait, thus eventually transferring the smells themselves. At some point, therefore, the gloves will need to be washed or discarded. Another solution which has been tried is simply that of washing the hands before and/or after baiting the hook. This solution may be effective depending on how thoroughly the hands are washed. However, this solution does raise the problem of maintaining clean water to wash the hands, and also adds another step to each baiting of the hook.

SUMMARY OF THE INVENTION

In accordance with the present invention, an apparatus for baiting a fish hook is provided. The apparatus includes two resiliently opposed base portions joined together at a common end. Extending from each base portion is an arm which culminates in a gripping portion for receiving and holding bait. Each gripping portion includes a longitudinally extending slot open at one end.

Advantageously, a shoulder portion extends downward from each base portion to provide better gripping by the hand. In addition, a general downward taper of each arm from the base portion to the gripping portion also provides more efficient gripping and handling. It is also desirable that the inner surfaces of the gripping portions be roughened to provide additional traction for gripping the bait.

In operation, the apparatus is gripped by one hand with the index finger extending lengthwise along one arm of the apparatus and the thumb extending along the opposite arm. For best results, the shoulder portions extend downward from the base portions and are overlapped by the middle finger or by other selected fingers of the operator's choosing, thereby providing a more firm secure grip. Bait, such as a worm or a salmon egg, may then be picked up with between the gripping portions by exerting a squeezing force between the thumb and opposed fingers. Once the bait has been picked up it is aligned with the hooking slits so that a hook may be inserted through the slits, piercing the bait and thereby baiting the hook.

From the foregoing a number of advantages of this invention are readily apparent. First of all, it is possible to bait a hook using this apparatus without ever having human hands touch the bait. Thus, no human scent is transferred to the bait so that fish are not scared off by human scents in the water. In addition, because the hands have not touched the bait, no smells or matter from the bait have been transferred to the human hands. The human hands therefore remain clean and unaffected by the baiting process. Additional advantages of this invention will become apparent when taken in conjunction with the accompanying drawings.

DETAILED DESCRIPTION

Figure 1:
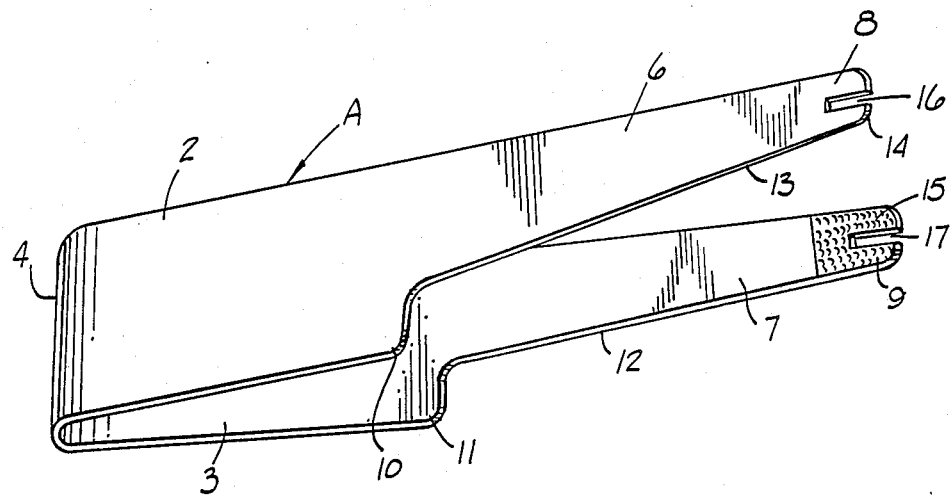
FIG. 1 is a perspective view of the fish baiting apparatus of the present invention.
Figure 2:
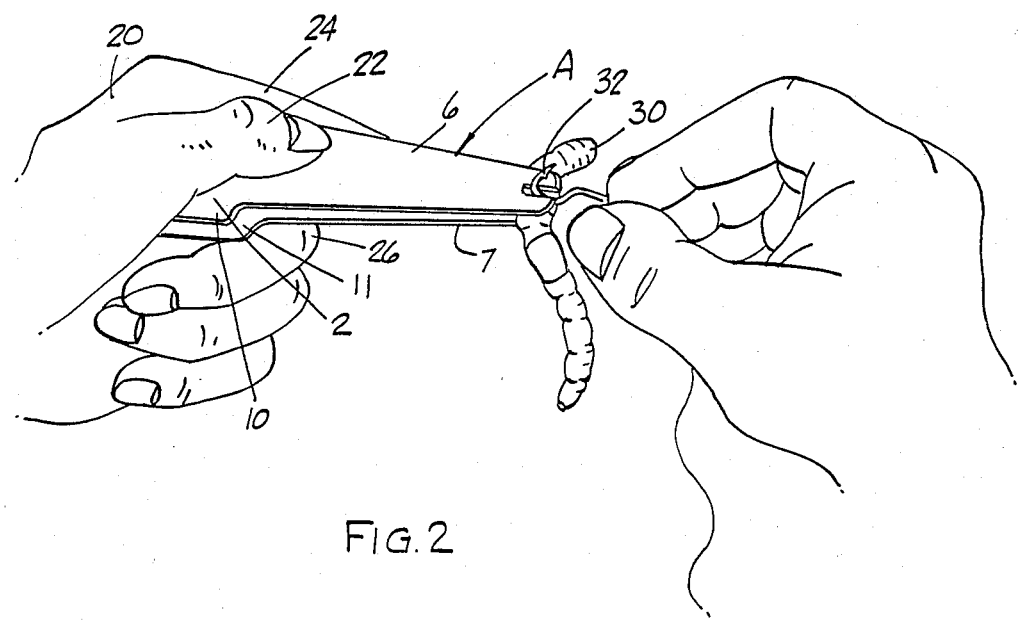
FIG. 2 is a perspective view of the apparatus in use, showing a worm being held and affixed to a fishing hook.

In accordance with the present invention, apparatus A for baiting a fishing hook is disclosed in FIGS. 1 and 2. The apparatus A includes two resiliently opposed base portions 2 and 3 joined together at a common end 4. The apparatus A may be constructed of any semi-rigid material capable of repeated resilient opening and closing action of the base portions 2 and 3, such as plastic, rubber or even metal. Arm portions 6 and 7 extend from base portions 2 and 3 and culminate in gripping portions 8 and 9. For better gripping of the apparatus A, shoulder portions 10 and 11 are provided on the lower end of base portions 2 and 3. The arms are preferably tapered along their lower edges 12 and 13 toward a more narrow end at the grip portions 8 and 9. Grip portions 8 and 9 have roughened inner surfaces 14 and 15 to provide better gripping of bait 30 held by the apparatus A. Slots 16 and 17 are provided in grip portions 8 and 9 to allow the passage of a hook through the apparatus A for piercing the bait 30 held by the apparatus A.

As depicted in FIG. 2, the apparatus A is operated by picking up the apparatus A with the hand 20, with the thumb 22 extending along selected arm 6 and the index finger 24 extending along opposite selected arm 7. For a secure grip, the middle finger 26 overlaps the shoulder portions 10 and 11. With the hand 20 holding the apparatus A in this position, the apparatus A may be operated by exerting a squeezing force between the thumb 22 and index finger 24, thereby bringing the grip portions 8 and 9 tightly together. When the squeezing portion is relaxed, the natural resilience of the apparatus A causes it to return to its open position as depicted in FIG. 1. By using this squeezing motion, the apparatus A may be manipulated to pick up bait such as a worm 30, as depicted in FIG. 2. The roughened inner surfaces 14 and 15 of grip portions 8 and 9 are very useful in holding the bait, as the bait is typically quite slippery. Once the bait has been grasped and aligned with slots 16 and 17, a hook 32 may be inserted through the bait by first passing the hook through the slot 16, then through the bait 30, and finally out the opposite slot 17. In this way, bait may be affixed to a fishing hook without ever being touched by human hands. As discussed previously, this baiting operation avoids problems of transfer of the human scent to the bait. Also avoided are associated problems of transferring the scent of the bait to the human hands, as well as the transfer of matter from the bait to the human hands. Thus, the apparatus A may be used to quickly, efficiently, and cleanly bait a fish hook while avoiding the problems associated with traditional methods of baiting the hook.

This invention has been described in detail with particular reference to preferred embodiments thereof, but it will be understood that variations and modifications can be effected within the spirit and scope of the invention.

I claim:

1. Apparatus for affixing bait to a fishing hook, comprising:

two resiliently opposed base portions joined together at a common end;

an arm extending from each of said base portions, said arm culminating in a gripping portion defining a slit having one open end, such that manually squeezing said base portions brings said gripping portions together to hold said bait while said fishing hook is passed through said slits to pierce said bait and affix said bait to said hook.

2. Apparatus as claimed in claim 1, wherein each of said base portions includes a shoulder portion adjacent said arm portion.

3. Apparatus as claimed in claim 1, wherein each of said gripping portions includes a roughened inner surface for providing traction when gripping said bait.

4. Apparatus as claimed in claim 1 wherein said arm portion is tapered from a wider end adjacent said base portion to a narrower gripping end.

* * * * *